(12) United States Patent
Ellenby et al.

(10) Patent No.: US 12,524,753 B2
(45) Date of Patent: Jan. 13, 2026

(54) PAYMENT DEVICE AND METHOD WITH DETECTION OF FALSIFIED PAYEE INFORMATION BASED ON WEIGHTED LOCATION DATA OBTAINED BY THE PAYMENT DEVICE

(71) Applicant: Yellcast, Inc., San Carlos, CA (US)

(72) Inventors: Peter Ellenby, Portland, OR (US); Thomas William Ellenby, Langhorne, PA (US); Ganesan Venkatakrishnan, San Carlos, CA (US); William Foster, Santa Fe, NM (US); Peter Negulescu, San Francisco, CA (US)

(73) Assignee: Yellcast, Inc., San Francisco, CA (US)

( * ) Notice: Subject to any disclaimer, the term of this patent is extended or adjusted under 35 U.S.C. 154(b) by 317 days.

(21) Appl. No.: 18/054,869

(22) Filed: Nov. 11, 2022

(65) Prior Publication Data

US 2024/0144231 A1    May 2, 2024

Related U.S. Application Data

(60) Provisional application No. 63/420,468, filed on Oct. 28, 2022.

(51) Int. Cl.
*G06Q 20/00*    (2012.01)
*G06Q 20/20*    (2012.01)
*G06Q 20/32*    (2012.01)
*G06Q 20/40*    (2012.01)

(52) U.S. Cl.
CPC ........ *G06Q 20/3224* (2013.01); *G06Q 20/20* (2013.01); *G06Q 20/4016* (2013.01)

(58) Field of Classification Search
CPC .............. G06Q 20/3224; G06Q 20/20; G06Q 20/4016; G06Q 20/4097; G06Q 20/3276; G06Q 20/4015
USPC .......................................................... 705/16
See application file for complete search history.

(56) References Cited

U.S. PATENT DOCUMENTS

| | | |
|---|---|---|
| 11,250,429 B1 | 2/2022 | Ravi et al. |
| 2010/0138345 A1 | 6/2010 | Lekhtman et al. |
| 2012/0095907 A1 | 4/2012 | Dorsey et al. |
| 2014/0244514 A1 | 8/2014 | Rodriguez et al. |
| 2015/0081462 A1 | 3/2015 | Ozvat et al. |
| 2015/0088751 A1* | 3/2015 | Grigg .................. G06Q 20/4016 705/44 |
| 2017/0109752 A1 | 4/2017 | Hubbard et al. |
| 2021/0374754 A1 | 12/2021 | Pandian et al. |
| 2021/0398130 A1 | 12/2021 | Nightengale et al. |

OTHER PUBLICATIONS

International Search Report and Written Opinion mailed Feb. 28, 2024, issued in International Patent Application No. PCT/US2023/077212.

* cited by examiner

*Primary Examiner* — Rokib Masud
(74) *Attorney, Agent, or Firm* — Haynes and Boone, LLP (57) ABSTRACT

The system and methods describe transaction spoofing detection based on a transaction notification from a mobile computing device, determining a location associated with the mobile computing device, determining an entity associated with the location that the transaction notifications are directed to at the geographic location, determining whether the transaction is directed to the first entity and providing an indication on the first mobile computing device indicating the transaction may be a security risk.

18 Claims, 8 Drawing Sheets

PAYMENT DEVICE AND METHOD WITH DETECTION OF FALSIFIED PAYEE INFORMATION BASED ON WEIGHTED LOCATION DATA OBTAINED BY THE PAYMENT DEVICE

CROSS-REFERENCES TO PRIORITY AND RELATED APPLICATIONS

This application claims priority from and is a non-provisional of the U.S. Provisional Patent Application No. 63/420,468 filed Oct. 28, 2022, entitled "Payment Device and Method with Detection of Falsified Payee Information Based on Weighted Location Data Obtained by the Payment Device." The entire disclosure of the application recited above is hereby incorporated by reference, as if set forth in full in this document, for all purposes.

The entire disclosure(s) of application(s)/patent(s) recited above is(are) hereby incorporated by reference, as if set forth in full in this document, for all purposes.

FIELD

The present disclosure generally relates to improving the security of electronic transaction processing systems and more particularly to securing electronic transactions using weighted location data.

BACKGROUND

Transaction security systems that facilitate electronic transactions are often vulnerable to attacks that target personal data and that can be altered to redirect payments to unauthorized parties. Criminals have long been involved in intercepting user data during electronic transactions, one of the most common being "skimming" of personal information during the use of credit cards and/or ATM cards. Skimming is the theft of personal information from the transaction security system which has been used in an otherwise normal electronic transaction. The thief can intercept the personal information such as a victim's card number using a small electronic device (skimmer) to swipe and store hundreds of victims' card numbers. The skimmer may be used in locations such as taxis, restaurants or bars when the victim's payment card is out of their immediate view. The skimmer may also use a small keypad to unobtrusively transcribe the three or four-digit security code, which is not present on the magnetic strip. Instances of skimming have been reported where the skipper is placed over the card slot of an ATM, to read the magnetic strip as the user unknowingly passes their card through the skimmer. These devices are often used in conjunction with a miniature camera to read the user's PIN at the same time. The security risks to the transaction security system are prevalent in many parts of the world.

With the advent of various touchless payment systems for electronic transactions criminals are seeking new ways to capitalize and exploit the security measures around these touchless payment systems to obtain person information. An example of touchless payment systems is initiated by scanning a QR code. There are several applications of QR code payment systems across the world. In countries such as China, India and Bangladesh QR code payment systems are very popular and convenient method of making payments. Since the first QR payment system was developed in 2011 the QR mobile payment system was quickly adopted in China. As of 2018, around 83% of payments were made via mobile QR payment systems. One common exploit targeting the QR payment system involves posting nefarious false QR codes that mislead or direct consumers into making a payment to a different account than that of the merchant they intend to transact with.

SUMMARY

Transaction verification using weighted locational data aims to alleviate problems of false QR payment codes and a variety of other nefarious transactions that may be initiated in other manners (credit card swiping, touchless credit card payments at a terminal and mobile device payments at a terminal etc.) at places of business by comparing the current transaction and the account or entity the payment is being directed to, to past transactions that have taken place in or near the current geographic location of the current transaction.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The transaction security system and methods described herein rely on the comparison of a current transaction taking place in a location to past transactions that have taken place at or near that location. The transaction security system may identify a location based on a latitude and longitude, a geolocated polygon, a geolocated 3D shape, a route associated with a mobile computing device. The transaction security system may analyze the transactions at the location to identify the patterns in the transaction associated with that location such as the account the funds are sent to, the entity associated with the location, and the like. For example, each transaction that has taken place in that location may result in funds being sent to an account, usually that of the vendor or point of purchase or entity doing business at or associated with that location. The transaction security system may identify based on the comparison the percentage of transactions that went to each different account at that location. The transaction security system may receive the location data for the requested transaction based on a position of a mobile computing device the user was interacting with to initiate the transaction.

Examples of the mobile computing device may include a smart phone, a tablet, a smart watch or any other computing device that includes a positioning mechanism such an inertial positioning system, a Geographical Positioning System (GPS) or the like. In an example, the transaction security system may determine that a large majority of the transactions that have taken place in that location have gone to the vendor or the point of purchase or the account of the business at that location.

For example, the transaction security system may be used with a transaction processing system that allows for electronically initiated transactions at various locations. Examples of transaction processing systems may include payment systems that allow for transfer of payments through a unique personal identifier or unique account name Payment systems that allow transfer through unique personal identifier include Venmo™ payment system, the Zelle™ payment system, the PayPal® payment system, and the like. A transaction processing system might initiate a transaction between two entities, such as between individuals, between an individual and a vendor or a point of purchases. The transaction processing system might use an account name that is unique to the entity such as the vendor, the individual or the point of purchase. For example, the entity may have a unique account name—@hotdogs. The account name may be associated with a hot dog stand that owns that account and a vast majority of the transaction processing system transfers that take place in or near the location of the hot dog stand go to that account, @hotdogs. The transaction processing system uses a location check to for each transaction. The transaction security system may receive historic transactions from the vendor or the point of purchase to authenticate transactions that do not have a location tag. The transaction security system may tag these transactions as verified transactions that had indeed taken place in that location. The transaction security system may use this information to more quickly build the located transaction database for comparative data and transaction verification.

For the following examples of the system in use the transaction processing system will be used, but it should be noted that a variety of transaction methods could be used in the system and methods described herein. A verification threshold of 90% of the transactions that have taken place in a location going to one specific account shall also be used for the following examples.

In an example, the transaction security system may receive a location from a mobile computing device associated with a user visiting the fore mentioned hotdog stand. The user associated with the transaction security system may place their order and may be given their hotdogs. The user scans a QR code to initiate a contactless payment via the transaction processing system. The transaction security system may determine that the payment initiated for the food is directed to the transaction processing system account @hotdog and that 95% of transactions at that location go to the @hotdog account. Based on the threshold being met, the transaction security system may approve the transaction and the payment goes through.

In an example assume the transaction security system is associated with a transaction happening at the hotdog stand. In this instance, the transaction security system performs the same steps as in the previous example. The transaction security system may determine the account the transaction is directed to falls under the 90% threshold and the transaction is paused to await further verification. The transaction security system may prompt the customer to confirm the account details. In an embodiment, the transaction security system may alert the vendor device or point of purchase device or the customer device that there is a suspect transaction. The vendor or point of purchase looks at the device, most likely a mobile smart phone, that the customer is using to initiate the payment and sees that the payment is being directed to their @hotdog account associated with the transaction processing system. Based on the verification, the transaction security system receives a confirmation from the customer, that verifies the transaction as legitimate and the transaction is completed. In some embodiments, the transaction security system may transmit an alert to the vendor device or point of purchase device about a suspect transaction taking place in their location. For example, the vendor or the point of purchase device may be a mobile phone or another transaction terminal. The transaction security system may receive the approval or denial of the transaction from the vendor device or point of purchase device.

In an example similar to the previous example assume the transaction falls within the transaction threshold percentage for that location and the transaction security system pauses the transaction. The transaction security system may receive an input from either the customer device or the point of purchase device that the transaction is not going to the correct account, vendor or the point of purchase. The transaction security system may receive an input from the customer. For example, the customer may ask the vendor or the point of purchase to confirm the transition is being routed to the right account and the customer computing device may be used to send a response to the transaction security system. The transaction security system may analyze the response and notify the vender device or the point of purchase device with an alert notifying that the transaction processing system transaction was slated to be sent to an account with the account name @hamburger, an illegitimate account. The transaction security system may deny the transaction and the vendor or point of purchase device may be notified about a fake or nefarious QR code that may have pasted over their legitimate QR code. The transaction security system may prompt the vendor device to remove the fake QR code and restore the legitimate QR code.

In an example, the transaction security system may present a customer with an explicit override option when a legitimate transaction is flagged as an illegitimate transaction. For example, assume the transaction security system has two registered customers who have just shared lunch at a restaurant. The transaction processing system may secure the transaction between the first customer and the payment account of the restaurant via the transaction processing system. For example, the transaction processing system may determine the payment account of the restaurant at that location may have a threshold score above the pre-determined threshold value. The transaction security system may receive a notification from the second customer transferring his share of the bill to the first customer. The transaction security system may flag the transaction as the first customer account may fall below the threshold percentage for the second customer account at that location. The transaction security system may notify the second customer the transaction may be potentially illegitimate and allow the second customer to override the warning and complete the transaction.

Figure 1:
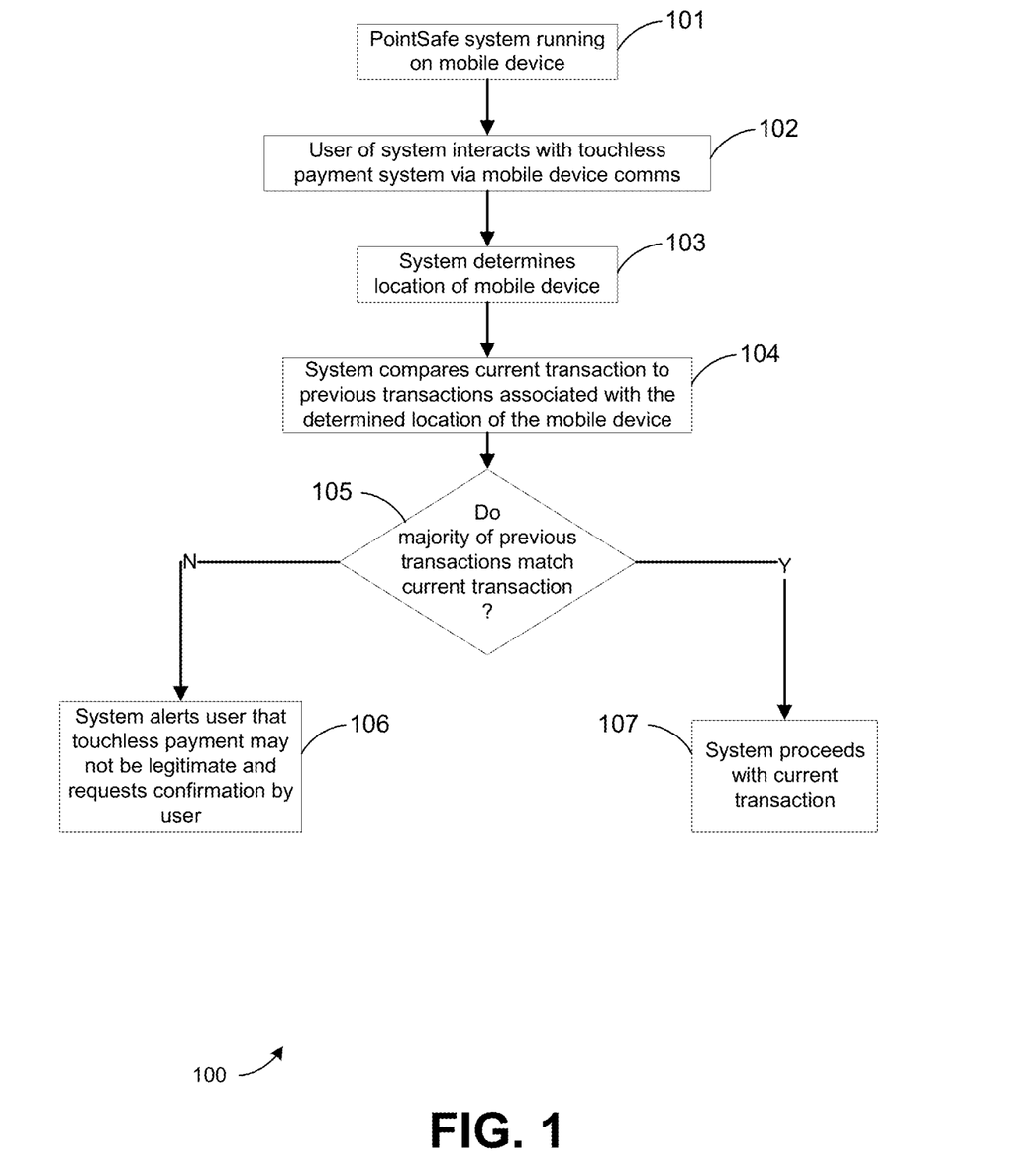
FIG. 1 is a flowchart that illustrates a possible mode of operation of the invention.

FIG. 1 is a flowchart 100 that illustrates a possible mode of operation of the invention. In step 101 an application for communication with a transaction security system is started on a mobile device. For example, the transaction security system may run on a mobile device in the background. The flowchart then branches to step 102. In step 102 the user intersects with a transaction processing system using the mobile device. Transaction processing systems may be contactless and may not require physical contact with a terminal, keypad, and the like, and may include, but are not limited to, optically scanned graphics such as QR codes and bar codes, near field communications methods such as Bluetooth, and the like. For example, these transaction processing systems may be similar to communication methods used in processing systems that are available at a point of sale. Examples of communication methods available at a point of sale may include communications methods used in ApplePay™, Square™, and the like. The flowchart then branches to step 103. In step 103 the transaction security system determines the location of the mobile device at the time of the interaction with the transaction processing system. The flowchart then branches to step 104. In step 104 the system compares the current transaction to previous transactions associated with the determined location of the mobile device or alternatively within a pre-defined range threshold from the determined location of the mobile device. The flowchart then branches to step 105. In step 105 the transaction security system determines if the majority of previous transactions at or near the determined location of the mobile device match the current transaction. If the majority of previous transactions at or near the determined location of the mobile device do not match the current transaction the flowchart then branches to step 106 in which the user of the transaction security system would be alerted that the transaction processing method they are attempting to use may not be legitimate and are prompted to request a confirmation from the proprietor associated with that location regarding the validity of the transaction processing method such as the contactless transaction processing system. If a majority of previous transactions at or near the determined location of the mobile device do match the current transaction then the flowchart branches to step 107 in which the system proceeds with the transaction.

Figure 2:
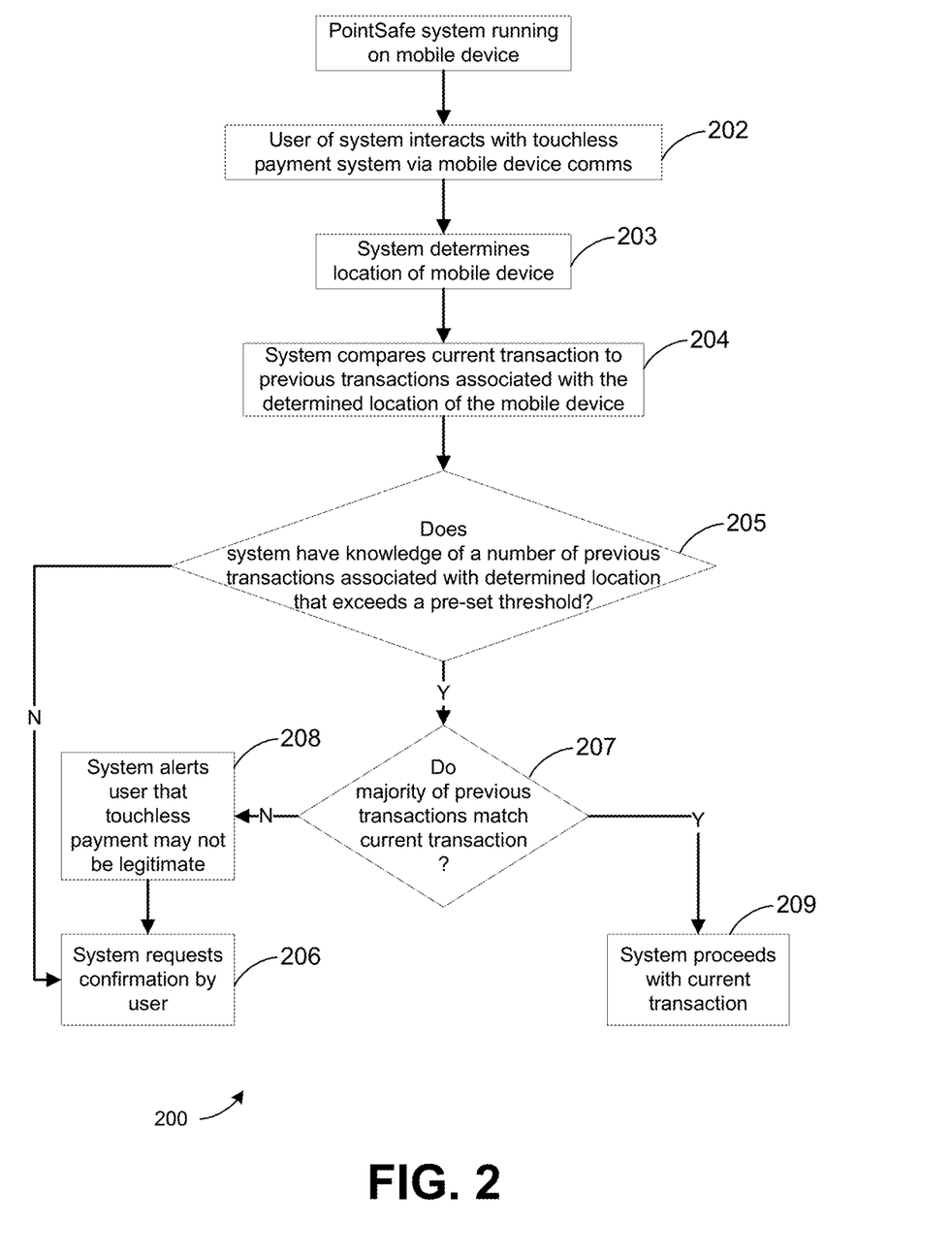
FIG. 2 is a flowchart that illustrates a possible more advanced mode of operation of the invention.

FIG. 2 is a flowchart 200 that illustrates a possible more advanced mode of operation of the invention. In step 201 the transaction security system may be in communication with an application running on a mobile device. The flowchart then branches to step 202. In step 202 the user intersects with the transaction processing system such as a transaction processing system using the mobile device. The flowchart then branches to step 203. In step 203 the transaction security system determines the location of the mobile device at the time of the interaction with the transaction processing system. The flowchart then branches to step 204. In step 204 the transaction security system compares the current transaction to previous transactions associated with the determined location of the mobile device or alternatively within a pre-defined range threshold from the determined location of the mobile device. The flowchart then branches to step 205. In step 205 the transaction security system determines if it has knowledge of a number of transactions associated with the determined location (or within a radius of said determined location) that exceeds a pre-set threshold of number of transactions needed to proceed. If the transaction security system determines it does not have knowledge of a number of transactions associated with the determined location (or within a radius of said determined location) that exceeds a pre-set threshold of number of transactions needed to proceed the flowchart branches to step 206 in which the system prompts the user of the system to confirm the legitimacy of the transaction processing system being used. If the transaction security system determines it does have knowledge of a number of transactions associated with the determined location (or within a radius of said determined location) that exceeds a pre-set threshold of number of transactions needed to proceed the flowchart branches to step 207. In step 207 the transaction security system determines if the majority of previous transactions at or near the determined location of the mobile device match the current transaction. If the majority of previous transactions at or near the determined location of the mobile device do not match the current transaction the flowchart then branches to step 208, in which the user of the transaction security system would be alerted that the transaction processing method such as the contactless transaction processing method they are attempting to use may not be legitimate, and then branches to step 206 in which the user of the transaction security system is prompted to request a confirmation from the proprietor associated with that location regarding the validity of the transaction processing system. If a majority of previous transactions at or near the determined location of the mobile device do match the current transaction then the flowchart branches to step 209 in which the system proceeds with the transaction.

Figure 3:
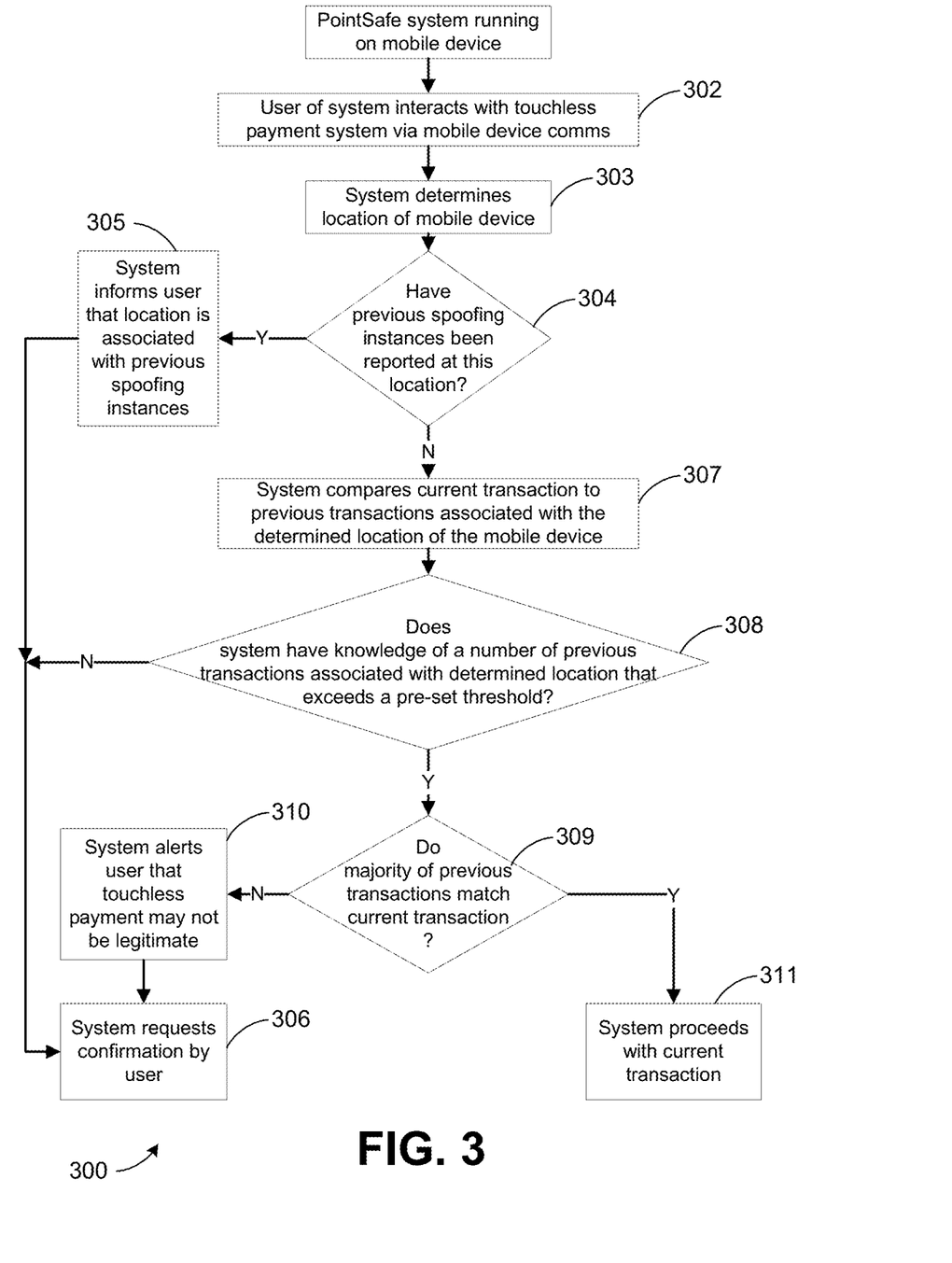
FIG. 3 is a flowchart that illustrates a possible more advanced mode of operation of the invention.

FIG. 3 is a flowchart 300 that illustrates a possible more advanced mode of operation of the invention. In step 301 the application in communication with the transaction security system is running on a mobile device. The flowchart then branches to step 302. In step 302 the user intersects with a transaction processing system such as a contactless transaction processing system using the mobile device. The flowchart then branches to step 303. In step 303 the transaction security system determines the location of the mobile device at the time of the interaction with the transaction processing system. The flowchart then branches to step 304. In step 304 the transaction security system determines if there have been previous reported spoofing attempts reported at or near the determined position of the mobile device. If there have been previous reported spoofing attempts reported at or near the determined position of the mobile device the flowchart then branches to step 306 in which the user of the transaction security system is prompted to request a confirmation from the proprietor associated with that location regarding the validity of the transaction processing method. If there have not been previous reported spoofing attempts reported at or near the determined position of the mobile device the flowchart then branches to step 307. In step 307 the transaction security system compares the current transaction to previous transactions associated with the determined location of the mobile device or alternatively within a predefined range threshold from the determined location of the mobile device. The flowchart then branches to step 308. In step 308 the transaction security system determines if it has knowledge of a number of transactions associated with the determined location (or within a radius of said determined location) that exceeds a pre-set threshold of number of transactions needed to proceed. If the transaction security system determines it does not have knowledge of a number of transactions associated with the determined location (or within a radius of said determined location) that exceeds a pre-set threshold of number of transactions needed to proceed the flowchart branches to step 306 in which the transaction security system prompts the user of the system to confirm the legitimacy of the transaction processing system being used. If the transaction security system determines it does have knowledge of a number of transactions associated with the determined location (or within a radius of said determined location) that exceeds a pre-set threshold of number of transactions needed to proceed the flowchart branches to step 309. In step 309 the transaction security system determines if the majority of previous transactions at or near the determined location of the mobile device match the current transaction. If the majority of previous transactions at or near the determined location of the mobile device do not match the current transaction the flowchart then branches to step 310, in which the user of the transaction security system would be alerted that the transaction processing method they are attempting to use may not be legitimate, and then branches to step 306 in which the user of the transaction security system is prompted to request a confirmation from the proprietor associated with that location regarding the validity of the transaction processing method. If a majority of previous transactions at or near the determined location of the mobile device do match the current transaction then the flowchart branches to step 311 in which the transaction security system proceeds with the transaction.

There may be instance of a user transacting with a vendor or point of purchase that may be in motion and therefore have many locations, for example vendor or point of purchases onboard ferries and trains. Positions along a known route, such as the known course of a ferry or the tracks of the Amtrak rail system, or within a geographically located polygon associated with such a route could be used as the master locations for the transaction verification system. In this manner transactions that fell within those positions would be used to discover the account that met the verification threshold for that location. The system would then function as described in the previous examples.

Figure 4:
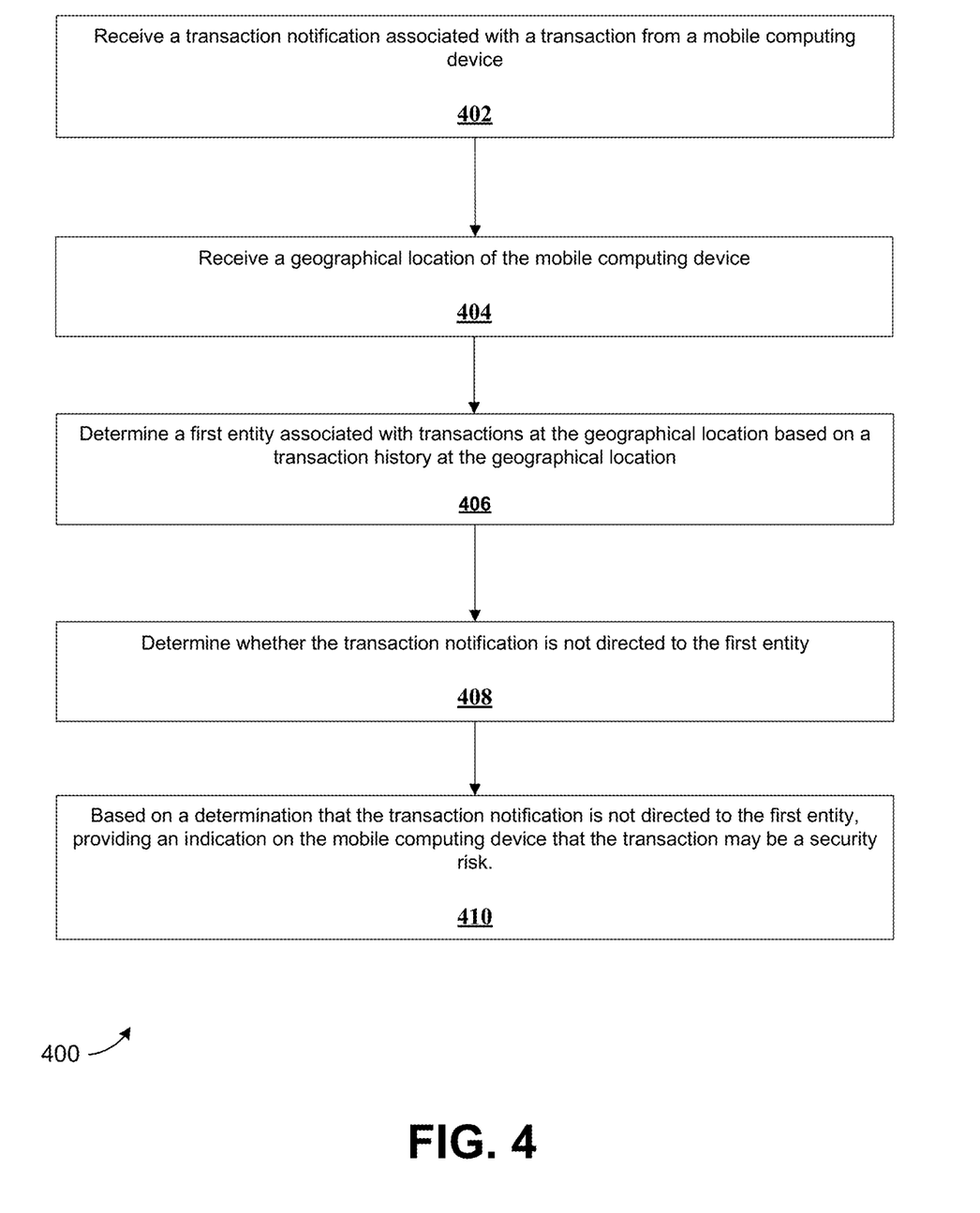
FIG. 4 is a flowchart that illustrates a possible more advanced mode of operation of the invention.

FIG. 4 is a flowchart 400 that illustrates a possible more advanced mode of operation of the invention. In step 402 the transaction security system may receive a transaction notification associated with the transaction from a mobile computing device. For example, an application on the mobile computing device may interface with the transaction processing system to identify an attempted transaction. In an embodiment, the transaction processing system may send a notification to the transaction verification system on the server side. The flowchart then branches to step 404. In step 404 the transaction security system may receive a geographical location of the mobile computing device. For example, the application running on the mobile computing device may determine the geographical location based on the GPS system, inertial navigation system, location of the cellular towers, wireless network identifies and the like. The flowchart then branches to step 406. In step 406 the transaction security system may determine a first entity associated with transactions at the geographical location based on a transaction history at the geographical location. The flowchart then branches to step 408. In step 408 the transaction security system determines whether the transaction notification is not directed to the first entity associated with the geographical location. If the transaction security system determines that the transaction notification is not directed to the first entity associated with the geographical location the flowchart branches to step 410. In step 410 the transaction security system provides an indication that the transaction may be a security risk. For example, the transaction security system may provide a notification on the mobile computing device that the transaction may be a security risk. In an embodiment, the transaction security system may provide a notification that the transaction may be a security risk on a point of sale device.

In an embodiment, the transaction security system may provide an indication that the transaction is associated with a second entity, display information about the second entity in addition to the notification that the transaction may be a security risk. For example, the transaction security system may determine that the geographical location is associated with spoofing attempts based on historical transaction information. The transaction security system may also provide an indication that the geographical location is associated with prior spoofed transactions. The transaction security system may process the transaction based on an override from the mobile computing device. In an embodiment, the transaction security system may not have sufficient history about the transaction and may request confirmation from the mobile computing device before processing the transaction. In an embodiment, the transaction security system may not have sufficient history about the transaction and may request a transaction history from the first entity to establish transaction history at the geographic location before processing the transaction.

Figure 5:
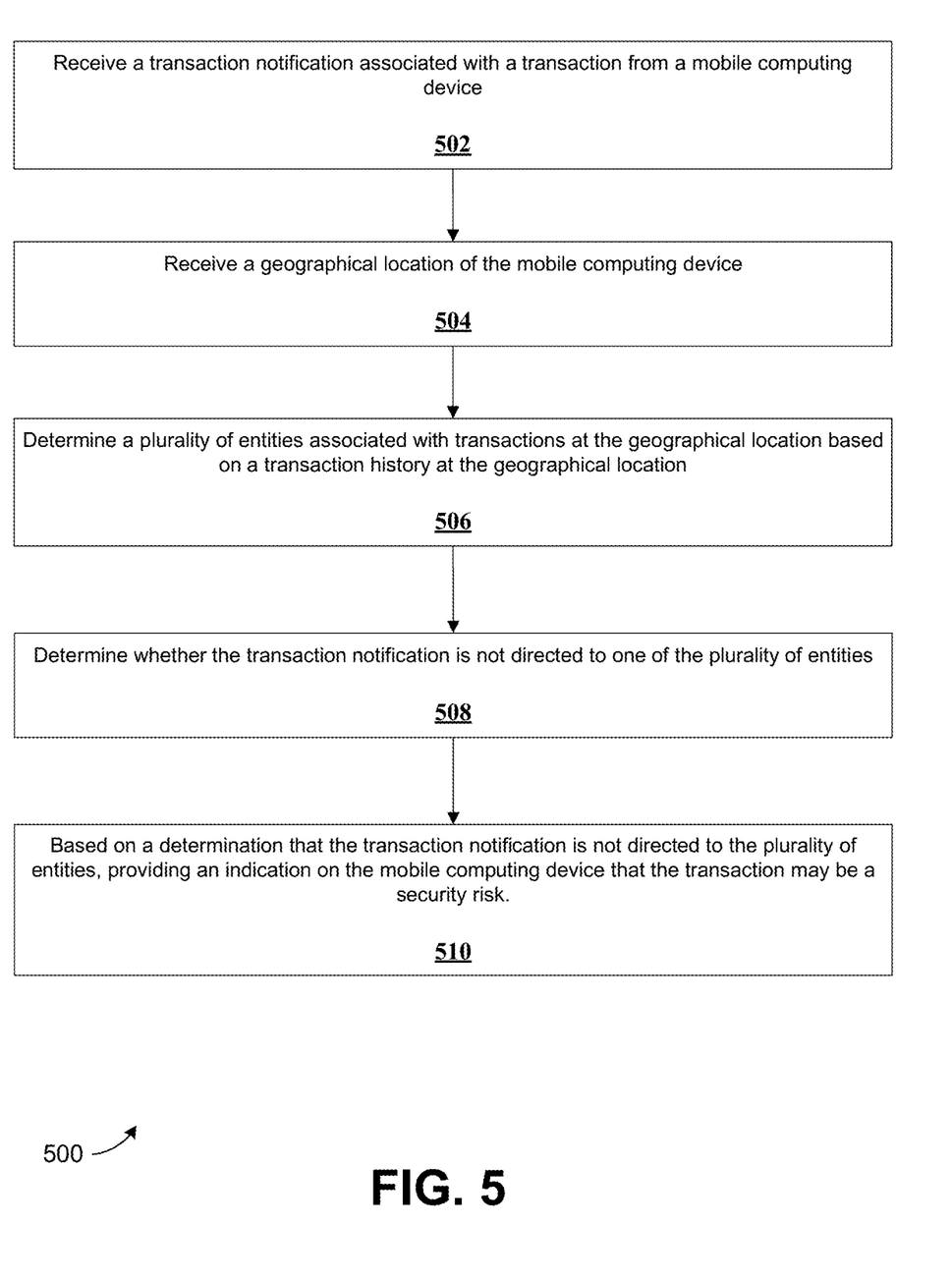
FIG. 5 is a flowchart that illustrates a possible more advanced mode of operation of the invention.

FIG. 5 is a flowchart 500 that illustrates a possible more advanced mode of operation of the invention. In step 502 the transaction security system may receive a transaction notification associated with the transaction from a mobile computing device. For example, an application on the mobile computing device may interface with the transaction processing system to identify an attempted transaction. In an embodiment, the transaction processing system may send a notification to the transaction verification system on the server side. The flowchart then branches to step 504. In step 504 the transaction security system may receive a geographical location of the mobile computing device. For example, the application running on the mobile computing device may determine the geographical location based on the GPS system, inertial navigation system, location of the cellular towers, wireless network identifies and the like. The flowchart then branches to step 506. In step 506 the transaction security system may determine a plurality of entity associated with transactions at the geographical location based on a transaction history at the geographical location. The flowchart then branches to step 508. In step 508 the transaction security system determines whether the transaction notification is not directed to at least one of the plurality of entities associated with the geographical location. If the transaction security system determines that the transaction is directed to at least one of the plurality of entities associated with the geographical location the transaction security system may allow the transaction to proceed through the transaction processing system. If the transaction security system determines that the transaction notification is not directed to the plurality of entities associated with the geographical location the flowchart branches to step 510. In step 510 the transaction security system provides an indication that the transaction may be a security risk. For example, the transaction security system may provide a notification on the mobile computing device that the transaction may be a security risk. In an embodiment, the transaction security system may provide a notification that the transaction may be a security risk on a point of sale device.

In some embodiments, the transaction security system may receive an override response from the mobile computing device after providing a notification. The transaction security system may then allow processing of the transaction via the transaction processing system.

Figure 6:
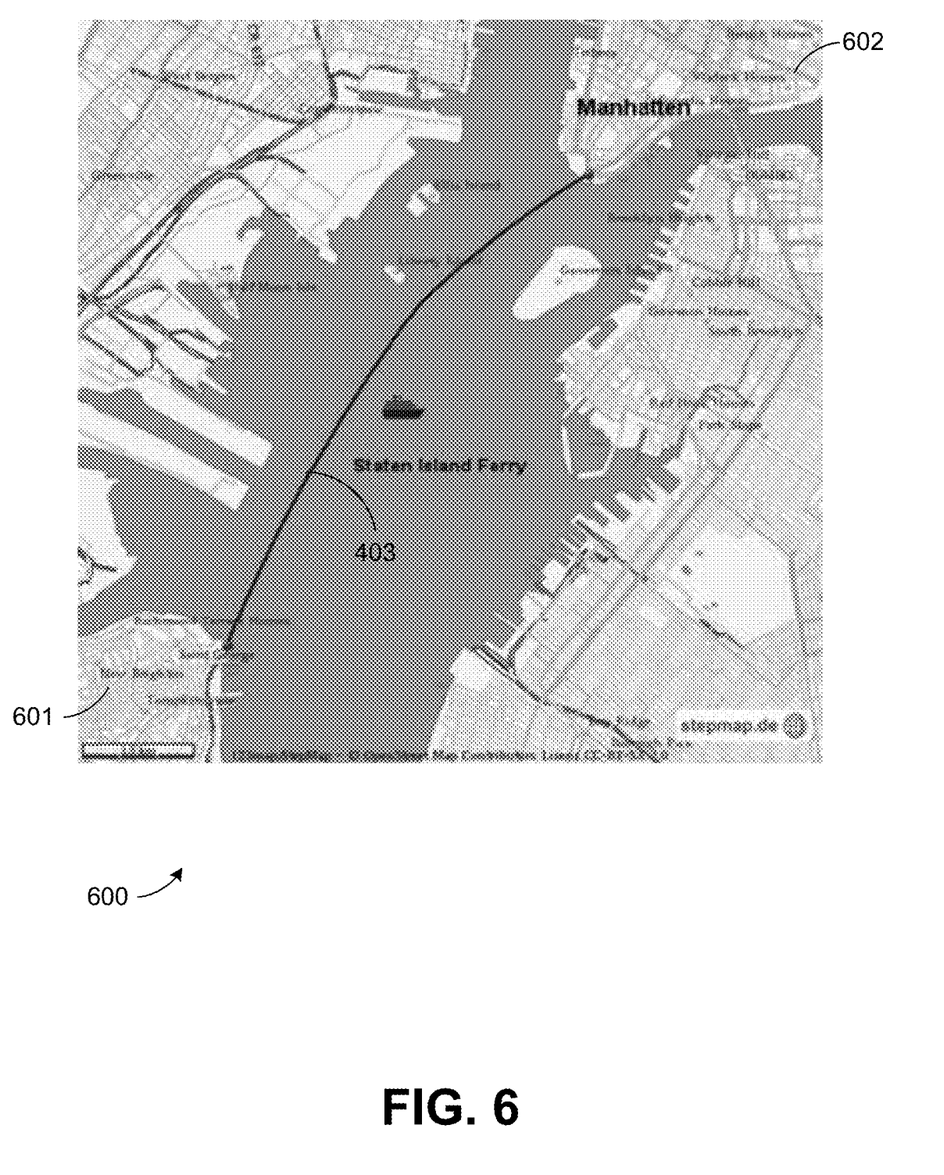
FIG. 6 is an illustration in plan view of the known route of a vehicle.

FIG. 6 is an illustration in plain view 600 of a route of the Staten Island Ferry. The ferry transits to and from Staten Island 601 and Manhattan Island 602 via a known route 603. Locations along the know route 603 may be used by systems of the invention to confirm the validity of transaction processing system onboard the ferry. Time may also be used as a factor in the example, i.e., the ferry is on a known route and at a specific time the ferry is known to be at or near a specific location along that route. Alternatively, locations within a polygon associated with the know route 603, for example a polygon defined by the known route of the ferry 603 and a distance from the known route such as 100 m, may be used by the system in a similar way. Of course, what is depicted in FIG. 6 could apply to other ferries, other modes of transportation with publicly available route information as well as other services.

There may be instances, such as transactions that take place on an airplane, where the user's device is unable to receive accurate location data to be used to verify the transaction. In this instance the vehicle itself may provide locational data, and the account name that met the verification percentage threshold, over Wi-Fi, Bluetooth or other means to the user's device that then can be used for transaction verification.

Other vendor or point of purchases may move from one location to another. While no transactions would be made while moving from one location to another the location of the vendor or point of purchase would change. Examples of vendor or point of purchases who would fall into this category might include food trucks, circuses & carnivals, or craft vendor or point of purchases. Once they arrived at a new location, they would alert the transaction verification system of their new location and the verified user account name associated with their business. The name of the verified account could of course be stored in a user profile for each vendor or point of purchase and business. The system would then be able to include transactions completed at the vendor or point of purchase's previous locations in the weighing of the legitimacy of a transaction.

There may also be instances of multiple vendor or point of purchases occupying the same location. For this example, we will use a food cart pod. The carts in this example are stationary and have permanent locations within the pod. The location of the pod for the transaction verification system is a geolocated polygon representing the area of land the pod occupies. Within this pod there are four food carts doing business. They each have their own account name for transactions, @dimsum, @taco, @grilled-cheese and @bbq. Since there are four different legitimate accounts within the same location it is unlikely that any single one of them would meet the percentage verification percentage threshold to avoid having transactions flagged as potentially illegitimate. To remedy this the four individual carts would create a group consisting of all four account names for the system to consider when running a transaction's verification. Therefore, when a customer initiated a transaction with @taco even though @taco only accounts for 20% of transactions at the location, the transaction is verified because @taco is part of the account group given legitimate status in that location, an account group whose transactions combined as a whole meets the percentage verification threshold.

It should also be noted that if a majority of transactions at a specific location are legitimate then other information associated with that location, such as a geolocated POI, may also be considered trustworthy. For example, if all purchases through a transaction processing system such as a scanned QR code at the gift shop of a museum are determined to be legitimate then the other information associated with the POI of the museum, such as objects within the museum, etc., may also be trustworthy.

There also may be a situation, such as street parking meters, where the same QR code is used at multiple locations and tied to the same payment end user. The location of the mobile device is the driver for the check of transactions with that QR code at that location. A user at parking meter 10259 scans the QR code on the parking meter. The transaction security system compares the location of the mobile device to completed legitimate transactions and determines that the transaction with that QR code at that location is legitimate. The user later in the day scans a QR code on parking meter 55899. The transaction security system compares the determined location of the user's mobile device and determines that at that location there is suspected spoofing and informs the user to confirm that the QR code is legitimate, for example by making sure that a new QR code sticker has not been placed over the original.

Figure 7:
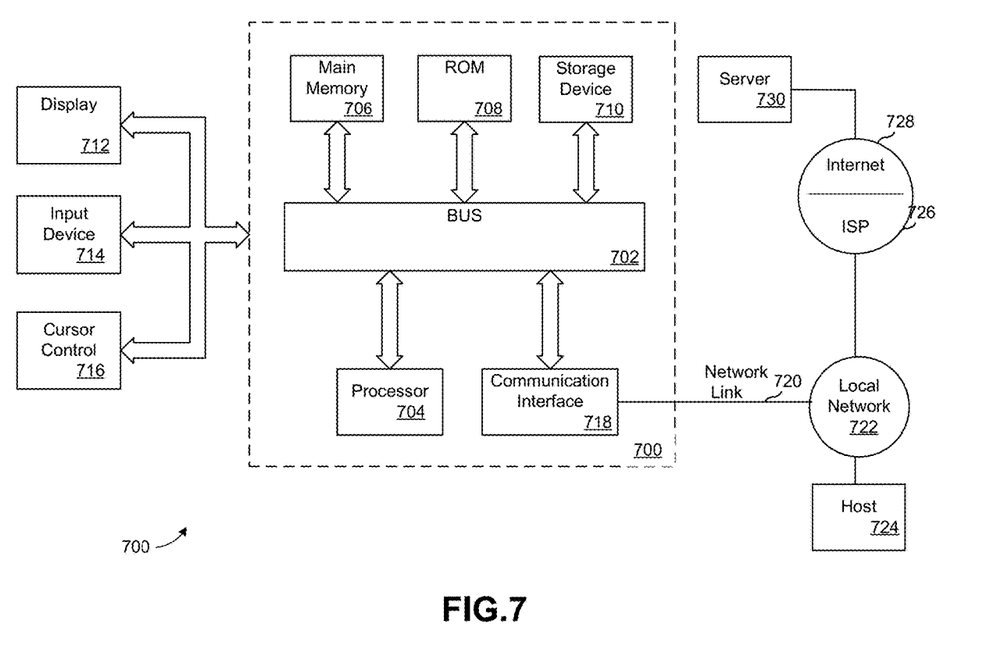
FIG. 7 illustrates an example computer system memory structure as might be used in performing methods described herein, according to various embodiments.

For example, FIG. 7 is a block diagram that illustrates a computer system 700 upon which the computer systems of the systems described herein may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 may also be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be a network card, a modem, a cable modem, or a satellite modem to provide a data communication connection to a corresponding type of telephone line or communications line. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through the Internet 728, ISP 726, local network 722, and communication interface 718. The received code may be executed by processor 704 as it is received, and/or stored in storage device 710, or other non-volatile storage for later execution.

Figure 8:
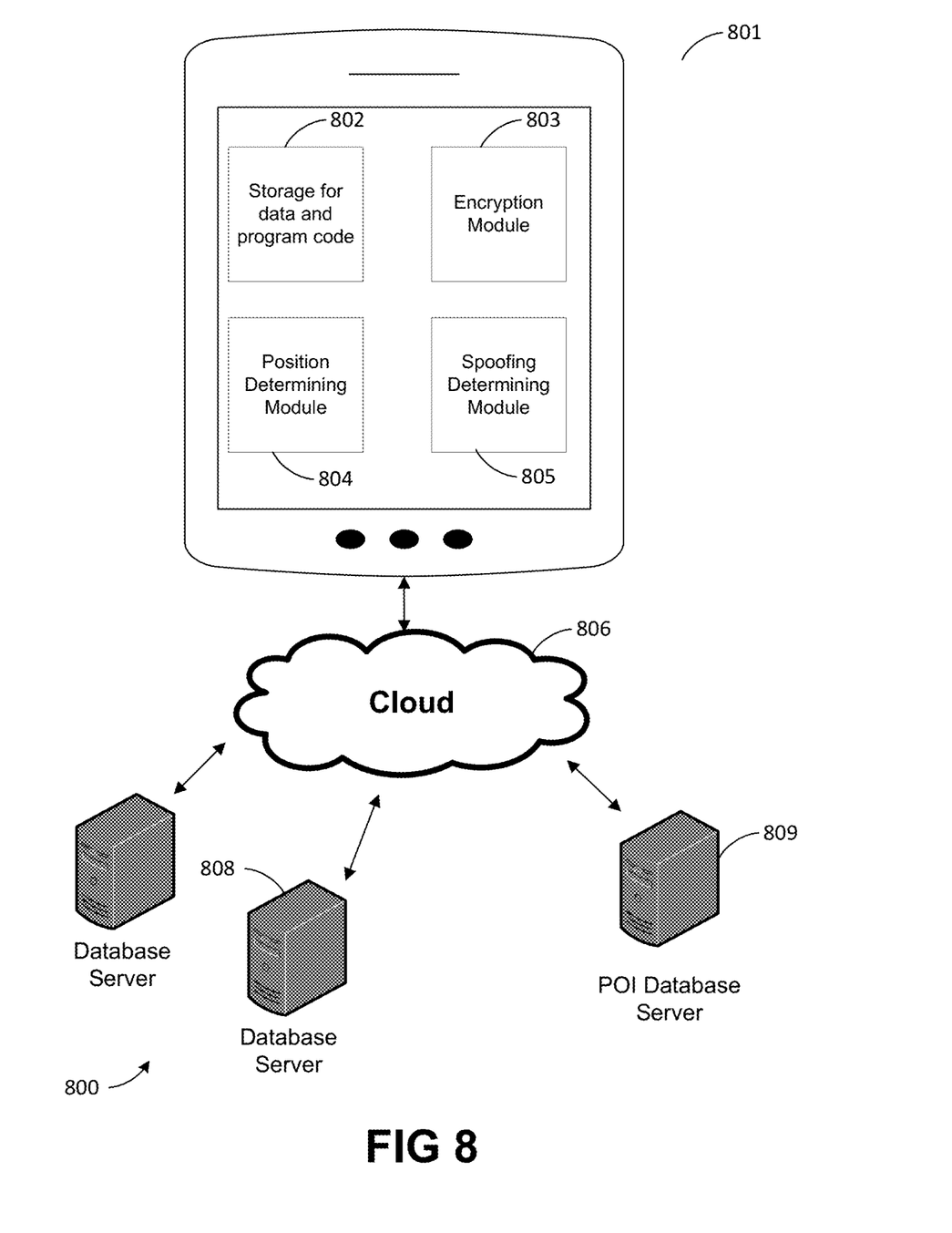
FIG. 8 is a block diagram illustrating an example computer system upon which the systems illustrated in FIG. 1 may be implemented, according to various embodiments.

FIG. 8 is a simplified functional block diagram 800 of an embodiment of a networked smart phone operable for user control of communication channels. A Smart Phone 801 comprises, among other components, storage for data and program code 802, an encryption module 803, a position determining module 804, an orientation determining module and spoofing determination module 805. Data from the position determining module 804 and orientation determining module can be used to generate a location of the transaction. In some embodiments, the position determining module and the orientation determining module may be used to determine gestures. The determined location is used to determine an entity associated with the determined location associated with a weighted majority of transactions at the determined location using various methods as described above. The smart phone is in communication via the cloud 806 with various database servers 807 and 808 that may contain additional information relating to the devices that are physically proximate to the smart phone 801 or are located within proximity of a location received from a cloud server 806 by the smart phone 801 or is associated with a device associated with the entity such as the entity associated with a weighted majority of transactions received from the cloud server 806 by the smart phone 801. This additional information may be accessed by severable communications system app module 803 and appended to determine spoofing attempts at the geographical location associated with transactions on the smart phone 801. The information such as the entities associated with geographic location may be transmitted via the cloud 806 to a database server 809 in which the information defining the entities at the location is stored and made available to various applications. For example, the cloud server 806 may use the entity associated with a transaction request from the Smart Phone 801 to identify a spoofing attempt associated with the transaction request on the Smart Phone 801.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for detecting falsification of vendor information using a payment device, the method comprising:
   under the control of one or more computer systems configured with executable instructions:
   receiving a transaction notification associated with a transaction from a mobile computing device;
   receiving a geographical location of the mobile computing device;
   verifying a first vendor, wherein verifying comprises:
   (i) determining previous transactions recorded at the geographical location;
   (ii) comparing the transaction notification with the previous transactions at the geographical location;
   (iii) determining whether the transaction notification is directed to the first vendor; and
   based on a determination that the transaction notification is not directed to the first vendor, thus indicating possible falsification of vendor information, providing an indication on the mobile computing device that the transaction may be a security risk.

2. The computer-implemented method of claim 1, further comprising:
   receiving an override response from the mobile computing device; and
   processing the transaction directed to a vendor other than the first vendor based on the override response.

3. The computer-implemented method of claim 1, further comprising:
   determining whether the transaction notification is directed to a second vendor in the transaction history associated with the mobile computing request; and
   based on a determination that the transaction is directed to the second vendor, displaying information about the second vendor, in addition to the indication that the transaction may be a security risk.

4. The computer-implemented method of claim 1, further comprising:
   determining whether the geographical location is associated with spoofing attempts based on historical transaction information;
   providing an additional indication on the mobile computing device that the geographic location is associated with prior spoofed transactions; and
   receiving confirmation from the mobile computing device before processing the transaction.

5. The computer-implemented method of claim 1, further comprising:
   determining whether the transaction history directed to the first vendor at the geographical location exceeds a pre-determined threshold;
   based on a determination that the transaction history directed to the first vendor does not exceed a pre-determined transaction threshold, providing an additional indication on the mobile computing device that the geographic location does not have sufficient transaction history directed to the first vendor; and
receiving confirmation from the mobile computing device before processing the transaction.

6. The computer-implemented method of claim 1, further comprising:
providing an additional indication to a point-of-sale device associated with the first vendor that the transaction may be an attempt at spoofing; and
receiving a confirmation from the point-of-sale device before processing the transaction.

7. The computer-implemented method of claim 1, wherein the first vendor is a known vendor associated with the geographic location.

8. The computer-implemented method of claim 1, wherein the transaction notification is associated with a contactless transaction.

9. The computer-implemented method of claim 1, further comprising:
determining the transaction notification is directed towards a uniform resource locator associated with a vendor other than the first vendor; and
providing the indication on the mobile computing device that the transaction may be a security risk.

10. The computer-implemented method of claim 1, further comprising:
determining whether the transaction history directed to the first vendor at the geographical location exceeds a pre-determined threshold;
based on a determination that the transaction history directed to the first vendor does not exceed a pre-determined transaction threshold, providing an indication on a computing device associated with the first vendor that the geographic location does not have sufficient transaction history directed to the first vendor;
receiving the transaction history from the first vendor to establish transaction history directed to the first vendor at the geographical location; and
processing the transaction.

11. A computer-implemented method for detecting falsification of vendor information using a payment device, the method comprising:
under the control of one or more computer systems configured with executable instructions:
receiving a transaction notification associated with a transaction from a mobile computing device;
receiving a geographical location of the mobile computing device;
verifying a plurality of vendors, wherein verifying comprises:
(i) determining previous transactions recorded at the geographical location;
(ii) comparing the transaction notification with the previous transactions at the geographical location;
(iii) determining whether the transaction notification is directed to one or more of the plurality of vendors; and
based on a determination that the transaction notification is not directed to one or more of the plurality of vendors, thus indicating possible falsification of vendor information, providing an indication on the mobile computing device that the transaction may be a security risk.

12. The computer-implemented method of claim 11, further comprising:
determining whether the transaction history directed to the plurality of entities at the geographical location exceeds a pre-determined threshold; and
based on a determination that the transaction history directed to the plurality of entities does not exceed a pre-determined transaction threshold, providing an indication on the mobile computing device that the geographic location does not have sufficient transaction history and may be a security risk.

13. A computer system comprising:
at least one processor; and
a computer-readable medium storing instructions, which when executed by the at least one processor, causes the computer system to:
receive a transaction notification associated with a transaction from a mobile computing device;
receive a geographical location of the mobile computing device;
verify a first vendor, wherein verifying comprises:
(i) determining previous transactions recorded at the geographical location;
(ii) comparing the transaction notification with the previous transactions at the geographical location;
(iii) determining whether the previous transactions at the geographical location exceed a pre-determined transaction threshold;
(iv) determining whether the transaction notification matches previous transactions directed to the first vendor; and
based on a determination that the transaction history at the geographical location directed to the first vendor exceeds the pre-determined transaction threshold, and that the transaction notification does not match the majority of the previous transactions, provide an indication on the mobile computing device that the transaction may be a security risk.

14. The computer system of claim 13, further comprising:
receiving an override response from the mobile computing device; and
processing the transaction a vendor other than the first vendor based on the override response.

15. The computer system of claim 13, further comprising:
determining a weighted location transaction history of entities at the geographical location using the transaction history at the geographical location; and
determining the first vendor associated with transactions at the geographical location based on the weighted location transaction history of entities associated with transactions at the geographical location.

16. A non-transitory computer-readable storage medium storing instructions, which when executed by at least one processor of a computer system, causes the computer system to:
receive a transaction notification associated with a transaction from a mobile computing device;
receive a geographical location of the mobile computing device;
verify a first vendor, wherein verifying comprises:
(i) determining previous transactions recorded at the geographical location;
(ii) comparing the transaction notification with the previous transactions at the geographical location;
(iii) determining whether the transaction notification is directed to the first vendor; and based on a determination that the transaction notification is not directed to the first vendor, provide an indication on a first vendor computing device associated with the first vendor that the transaction may be a security risk.

17. The non-transitory computer-readable storage medium of claim 16 further comprising instructions for receiving a confirmation from the first vendor computing device before processing the transaction.

18. The non-transitory computer-readable storage medium of claim 16, wherein determining the first vendor comprises determining that the first vendor is a vendor having a location at the geographical location and a transaction of payment transactions at, or near, the geographical location.

\* \* \* \* \*

UNITED STATES PATENT AND TRADEMARK OFFICE
CERTIFICATE OF CORRECTION

| | | |
|---|---|---|
| PATENT NO. | : 12,524,753 B2 | Page 1 of 1 |
| APPLICATION NO. | : 18/054869 | |
| DATED | : January 13, 2026 | |
| INVENTOR(S) | : Peter Ellenby et al. | |

It is certified that error appears in the above-identified patent and that said Letters Patent is hereby corrected as shown below:

In the Claims

Claim 14, Column 16, Lines 43-44, change:
"processing the transaction a vendor other than the first vendor based on the override response."
To:
--processing the transaction directed to a vendor other than the first vendor based on the override response.--

Signed and Sealed this
Tenth Day of February, 2026

John A. Squires
*Director of the United States Patent and Trademark Office*